United States Patent [19]

Weidner

[11] Patent Number: 4,642,024
[45] Date of Patent: Feb. 10, 1987

[54] COOLABLE STATOR ASSEMBLY FOR A ROTARY MACHINE

[75] Inventor: Robert H. Weidner, Glastonbury, Conn.

[73] Assignee: United Technologies Corporation, Hartford, Conn.

[21] Appl. No.: 678,518

[22] Filed: Dec. 5, 1984

[51] Int. Cl.$^4$ .............................................. F04D 25/28
[52] U.S. Cl. ..................................... 415/116; 415/117; 415/175; 415/180
[58] Field of Search ............... 415/115, 116, 117, 134, 415/135, 136, 137, 138, 170, 174, 216, 217; 416/95, 96, 97

[56] References Cited

U.S. PATENT DOCUMENTS

| | | | |
|---|---|---|---|
| 2,488,867 | 11/1949 | Judson | 415/136 |
| 2,651,496 | 10/1953 | Buckland et al. | 415/135 |
| 2,787,440 | 4/1957 | Thompson, Jr. | 415/12 |
| 2,847,185 | 8/1958 | Petrie et al. | 415/115 |
| 2,859,934 | 11/1958 | Halford et al. | 415/115 |
| 2,977,090 | 3/1961 | McCarty et al. | 416/96 R |
| 3,365,172 | 1/1968 | McDonough et al. | 415/117 |
| 3,391,904 | 7/1968 | Albert et al. | 415/170 R |
| 3,411,794 | 11/1968 | Allen | 277/53 |
| 3,575,528 | 4/1971 | Beam, Jr. et al. | 416/34 |
| 3,583,824 | 6/1971 | Smuland et al. | 415/117 |
| 3,588,276 | 6/1971 | Jubb | 416/95 |
| 3,603,599 | 10/1971 | Laird | 277/53 |
| 3,736,069 | 5/1973 | Beam, Jr. et al. | 415/115 |
| 3,742,705 | 7/1973 | Sifford | 60/39.66 |
| 3,814,313 | 6/1974 | Beam, Jr. et al. | 236/93 |
| 3,836,279 | 10/1974 | Lee | 415/116 |
| 3,965,066 | 6/1976 | Sterman et al. | 60/39.32 |
| 3,966,356 | 6/1976 | Irwin | 415/217 |
| 4,023,919 | 5/1977 | Patterson | 415/134 |
| 4,127,357 | 11/1978 | Patterson | 415/116 |
| 4,157,232 | 6/1979 | Bobo et al. | 415/116 |
| 4,177,004 | 12/1979 | Riedmiller et al. | 415/116 |
| 4,247,248 | 1/1981 | Chaplin et al. | 415/136 |
| 4,317,646 | 3/1982 | Steel et al. | 415/116 |
| 4,337,016 | 6/1982 | Chaplin | 415/116 |

FOREIGN PATENT DOCUMENTS

| | | |
|---|---|---|
| 1330893 | 9/1973 | United Kingdom . |
| 1484288 | 9/1977 | United Kingdom . |
| 1600722 | 10/1981 | United Kingdom . |
| 2076071 | 11/1981 | United Kingdom ............... 415/217 |
| 2081817 | 2/1984 | United Kingdom . |
| 2117843 | 11/1985 | United Kingdom . |

Primary Examiner—Robert E. Garrett
Assistant Examiner—Joan Kwon
Attorney, Agent, or Firm—Gene D. Fleischhauer

[57] ABSTRACT

A coolable stator assembly 16 for a gas turbine engine 10 is disclosed. The stator assembly includes an outer air seal 26 and an upstream support 32 and a downstream support 34 supporting the outer air seal about a flow path 14 for working medium gases. Various construction details are developed which enable impingement cooling of the outer air seal at a first location with cooling air and enable ducting a portion of the collected cooling air through the support for impingement cooling of the outer air seal at a second location. In one embodiment, metering holes 112 extend through the supports for directing the cooling air against the edge region of the outer air seal.

13 Claims, 3 Drawing Figures

COOLABLE STATOR ASSEMBLY FOR A ROTARY MACHINE

CROSS REFERENCE TO RELATED APPLICATIONS

This application relates to U.S. application Ser. No. 671,278, filed Nov. 13, 1984 for COOLABLE SEAL ASSEMBLY FOR A GAS TURBINE ENGINE by Robert H. Weidner; U.S. application Ser. No. 684,657, filed Dec. 21, 1984 for COOLABLE SEAL SEGMENT FOR A ROTARY MACHINE by Robert H. Weidner.

TECHNICAL FIELD

This invention relates to axial flow rotary machines of the type having a flow path for working medium gases. More particularly, the invention is about a seal formed of an array of seal segments that extend circumferentially about an axis of the machine for confining the working medium gases to the flow path. Although the invention was conceived during work in the field of axial flow gas turbine engines, the invention has application to other fields which employ rotary machines.

BACKGROUND ART

An axial flow, gas turbine engine typically has a compression section, a combustion section, and a turbine section. An annular flow path for working medium gases extends axially through these sections of the engine. A stator assembly extends about the annular flow path for directing and confining the working medium gases to the flow path.

As the gases are flowed along the flow path, the gases are pressurized in the compression section and flowed to the combustion section. The pressurized gases are burned with fuel In the combustion section to add energy to the gases. The hot, pressurized gases are expanded through the turbine section to produce useful work. A major portion of this work is used as output power, such as for driving a free turbine or developing thrust for an aircraft.

A remaining portion of the work generated by the turbine section is not used for output power. Instead, this portion of the work is used internally of the engine to compress the working medium gases in the compression section. A rotor assembly extends between the turbine section and the compression section to transfer this work from the turbine section to the compression section. The rotor assembly has rotor blades in the turbine section which extend outwardly across the working medium flow path for receiving work from the gases. The rotor blades are angled with respect to the approaching flow to receive work from the gases and to drive the rotor assembly about the axis of rotation.

An outer air seal circumscribes the rotor blades to confine the working medium gases to the flow path. The outer air seal is part of the stator assembly of the engine and typically is formed of a plurality of arcuate seal segments. The stator assembly further includes an engine case, such as an outer case, and a structure for supporting the seal segments of the outer air seal from the outer case. The outer case and the support structure position the seal segments in close proximity to the blades to block the leakage of the gases past the tips of the blades. As a result, the segments are in intimate contact with the hot working medium gases and receive heat from the gases. The segments are cooled to keep the temperature of the segments within acceptable limits.

One example of such a construction is shown in U.S. Pat. No. 3,583,824 issued to Smuland et al. entitled "Temperature Controlled Shroud and Shroud Support". Smuland employees on an outer air seal which is adapted by an upstream flange or hook 44 and a downstream hook 46 to engage a support. Cooling air is flowed in a cavity which extends circumferentially about the outer air seal between the outer air seal and an engine case. A seal means, such as an impingement plate or baffle, extends circumferentially about the outer air seal to define an impingement air cavity 58 therebetween. A plurality of holes extend through the impingement plate to precisely meter and direct the flow of cooling air through the impingment plate across the compartment 58 and against the outer surface 59 of the seal segment. The air is then gathered in the impingement air cavity. The cooling air is exhausted from the impingement air cavity through a plurality of axial passages 66 in the downstream hook 46 to provide a continuous flow of fluid through the plate and across the improvement cavity. This cooling air provides convective cooling to the edge region of the outer air seal as its passes through the compartment 64.

Cooling air holes in the inwardly extending hook, such as the holes 66, are not needed for some configurations. One example is an outer air seal formed of seal segments having a metallic substrate and a ceramic facing material. The ceramic facing material is attached to the metallic substrate and bounds the working medium flow path. The circumferential continuity of the hook is interrupted with a plurality of slots to decrease the hoop strength of the hook and to decrease the local variation in stresses in the metallic substrate which results from the presence of the hook. These slots more than adequately vent the impingement air cavity.

However, venting the cooling air from the cavity is not the only concern. In modern gas turbine engines it is also desirable to meter the flow of cooling air from the impingement cavity after it has been impinged against the outer air seal. The second metering provides a tighter control on the use of cooling air. This tigher control is important because the use of cooling air decreases the operating efficiency of the engine. This decrease occurs because the work diverted to pressurizing the cooling air is diverted from the work available for output power.

Because of the plurality of slots which extend through the hook, it is not possible to rely on holes through the hook to meter the flow of cooling air from the impingement air cavity unless the holes extend into the metallic substrate and a seal member is disposed adjacent to the hook to block the flow of cooling air through the slots in the hook. An alternate approach is to use holes in the seal element to provide the metering function. However, it is not always desirable to try to precisely meter the flow of cooling air from the impingement air cavity by either using a seal element having metering holes or using a seal element without holes and to provide metering holes in the substrate.

In addition, it is desirable to more effectively use the cooling air so that increased cooling is provided with the same amount of cooling air or the same amount of cooling is provided with a decrease in the amount of cooling air. More effectively using the cooling air increases output power and increases the overall engine efficiency while still providing enough cooling air so that the outer air seal has a satisfactory service life.

Accordingly, scientists and engineers are seeking to more efficiently supply cooling air to components such as outer air seal segments by both metering the flow of cooling air and more effectively using the cooling air.

DISCLOSURE OF INVENTION

According to the present invention, an outer air seal having vent passages engages a support for the outer air seal that has passages joined in serial flow communication through the vent passages with a cavity for cooling air for venting the cavity and for metering and directing the flow of cooling air from the cavity to another region of the engine.

In accordance with the present invention, the passage for cooling air in the support is radially oriented and directs the cooling air across a second cavity and against the outer air seal to provide impingement cooling to the outer air seal.

In accordance with one embodiment of the present invention, the outer air seal is formed of an array of arcuate seal segments each having a hook which engages the support, a passage through the hook for cooling air, and an edge region between the hook and the edge of the segment which is impingement cooled by cooling air flowed through the hook and thence through the support.

According to the present invention, cooling air is impinged on an outer air seal at a first location, collected and flowed through passages in the outer air seal and the support for the outer air seal to a second location where it is impinged a second time on an edge region of the outer air seal.

A primary feature of the present invention is an outer air seal formed of an array of arcuate seal segments. At least one of the seal segments has a passage for cooling air in flow communication with a source of cooling air. A support extends from an engine case to engage the outer air seal. The support has a passage in flow communication with the passage in the outer air seal for distributing the cooling air to a region of the engine adjacent to the support. In one embodiment, the source of cooling air is an impingement air cavity outwardly of the outer air seal which gathers cooling air after it is impinged on the outer air seal. The passage in the outer air seal and the passage in the support duct the cooling air from the impingement air cavity to a location where the air is impinged again on the outer air seal segment. In one embodiment, the passages in the outer air seal segment are slots which extend through a hook in the outer air seal segment to decrease the effect that the hook has on local stresses in the outer air seal.

A principal advantage of the present invention is the efficient use of cooling air which results from ducting and metering the cooling air through passages in the support to new locations to precisely deliver the cooling air to these locations. In one embodiment, an advantage is the engine efficiency which results from effectively using cooling air by impinging the cooling against the outer air seal at a first location and then ducting the cooling air through the support for the outer air seal to impinge the cooling air again on the outer air seal at a second location. In one embodiment, an advantage is the service life of a ceramic faced outer air seal which results from reducing local stress variations by slotting the hook used by the seal to engage a support for the seal. Excessive leakage through the slots is avoided by providing a seal member between the outer air seal and the support to block the leakage of cooling air through the slots. Metering and ducting the cooling air is provided by passages in the support. Another advantage of the present invention is the service life of the outer air seal and of the support for the outer air seal which results from transpirationally cooling the outer air seal and its support by flowing cooling air through passages in the outer air seal and the support.

The foregoing features and advantages of the present invention will become more apparent in light of the following detailed description of the best mode for carrying out the invention and in the accompanying drawings.

BEST MODE FOR CARRYING OUT THE INVENTION

Figure 1:
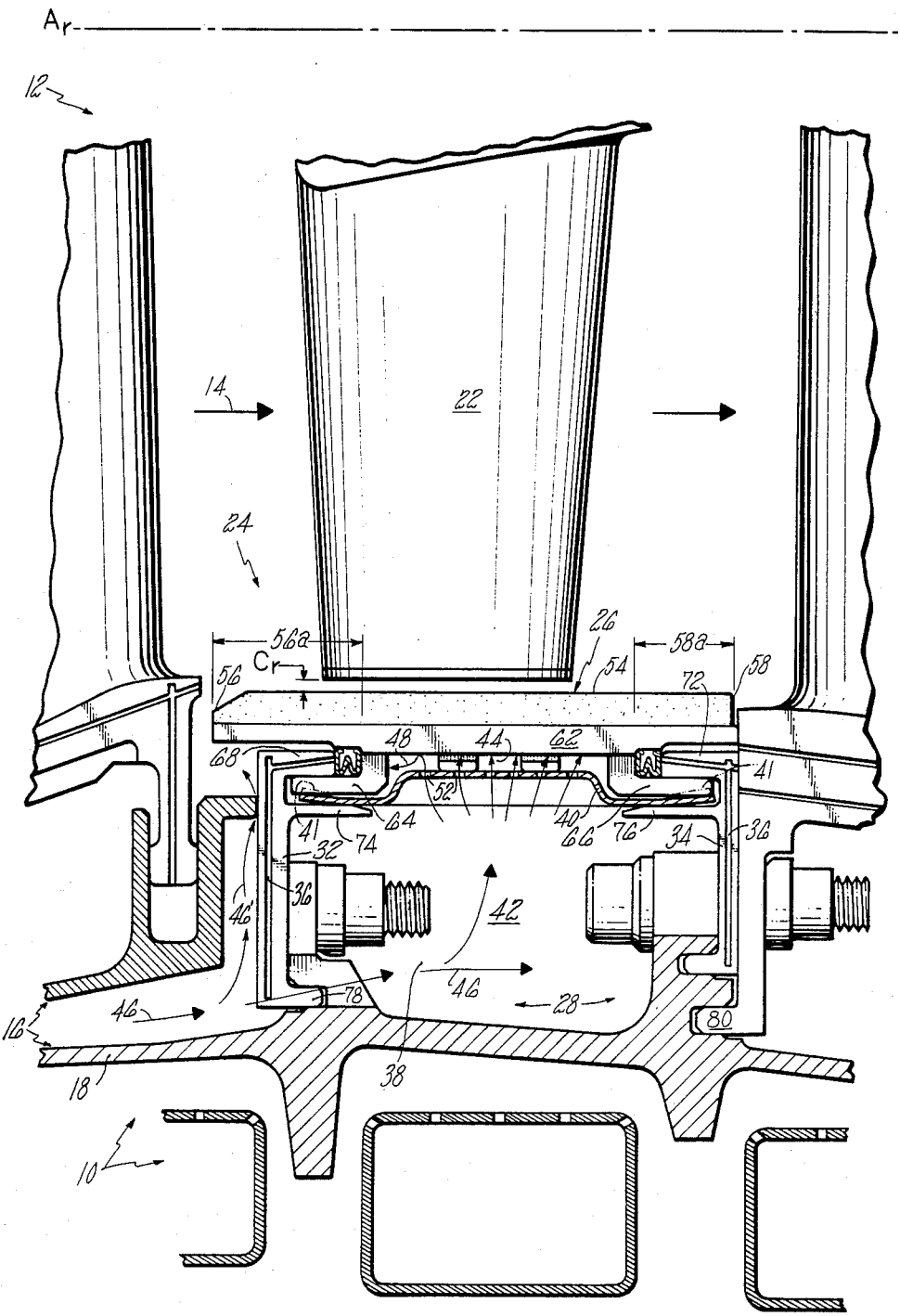
FIG. 1 is a side elevation view of an axial flow gas turbine engine 10 which shows a portion of the turbine section 12 and an axis of rotation $A_r$ of the engine.

FIG. 1 is a side elevation view of a portion of an axial flow, gas turbine engine 10 having an axis of rotation $A_r$. The view shows a portion of a turbine section 12. The turbine section includes an annular flow path 14 for working medium gases which is disposed about the axis $A_r$. A stator structure 16 bounds the working medium flow path. The stator structure includes an engine case, such as an outer case 18, which extends circumferentially about the working medium flow path. A plurality of rotor blades, as represented by the single rotor blade 22, extend radially outwardly across the working medium flow path into close proximity with the outer case.

A coolable stator assembly 24 outwardly of the rotor blades 22 extends about an axis $A_r$ to bound the annular flow path 14. The coolable stator assembly includes an outer air seal 26 and a means for supporting the outer air seal 28. The means for supporting the outer air seal includes an upstream support 32 and a downstream support 34 which extend inwardly from the outer case. Each support may be segmented to reduce the hoop strength of the support. The segments of the supports are adapted by slots 36 to received thin, flexible sheet metal seals (not shown). The supports are attached to the outer case 18 to support and position the outer air seal in the radial direction about the rotor blades.

The outer air seal is spaced radially inwardly from the outer case leaving a circumferentially extending cavity 38 therebetween. A circumferentially extending impingement plate 40 has ends 41 which are trapped between the outer air seal and the upstream and downstream supports 32, 34. The impingement plate is spaced radially inwardly from the outer case and is spaced radially outwardly from the outer air seal. The impingement plate divides the cavity 38 into an outer cavity 42 and into an inner, impingement air cavity 44.

A first flow path 46 for cooling air extends and outwardly of the working medium flow path 14 into the outer cavity 42. A leak path 46' extends radially inwardly from the first flow path 46 toward the working medium flow path. A secondary flow path, such as the second flow path 48 for cooling air, extends axially and circumferentially in the cavity 44 outwardly of the outer air seal. A plurality of impingement holes 52 in the impingement plate places the first flow path in flow communication with the second flow path. The impingement holes are sized to meter the flow of cooling air from the outer cavity and direct the flow of cooling air against the outer air seal.

The outer air seal 26 is formed of a plurality of arcuate seal segments, as represented by the single seal segment 54, which extend circumferentially about the working medium flow path. Each seal segment has a leading edge 56 at the upstream end and a trailing edge 58 at the downstream end. These seal segments are spaced radially from the rotor blades by a variable clearance $C_r$ to accommodate relative radial movement between the rotor blade and the outer air seal.

Each seal segment includes a plate 62 and hooks, such as upstream hook 64 and downstream hook 66, which are attached to the plate and adapt the plate to engage the support. The upstream hook extends from the plate at a location that is spaced axially from the leading edge leaving a leading edge region 56a therebetween. The downstream hook extends from the plate at a location that is spaced axially from the trailing edge leaving a trailing edge region 58a therebetween.

The upstream support 32 is adapted by a circumferentially extending upstream flange 68 to engage the upstream hook 64. The downstream support 34 is adapted by a circumferentially extending downstream flange 72 to engage the downstream hook 66. An outer flange 74 on the upstream support is spaced outwardly from the upstream flange and an outer flange 76 on the downstream support is spaced outwardly from the downstream flange. The outer flanges adapt the supports to trap the ends of the impingement plate 40 between the flanges and the hooks on the seal segment. The impingement plate is bent at the ends 41 to have a free height, as shown by the phantom lines, which is greater than the installed height. Because the impingement plate is trapped betweeen the hooks and the outer flanges, the impingement plate presses against the outer flanges 74, 76 of the supports and presses against the upstream and downstream hooks on the seal segment to sealingly urge the arcuate seal segments inwardly against the upstream flange 68 on the upstream support and the downstream flange 72 on the downstream support. A third flange 78 on the upstream support adapts the upstream support to engage the outer case and a third flange 80 on the downstream supports adapts the downstream support to engage the outer case.

Figure 2:
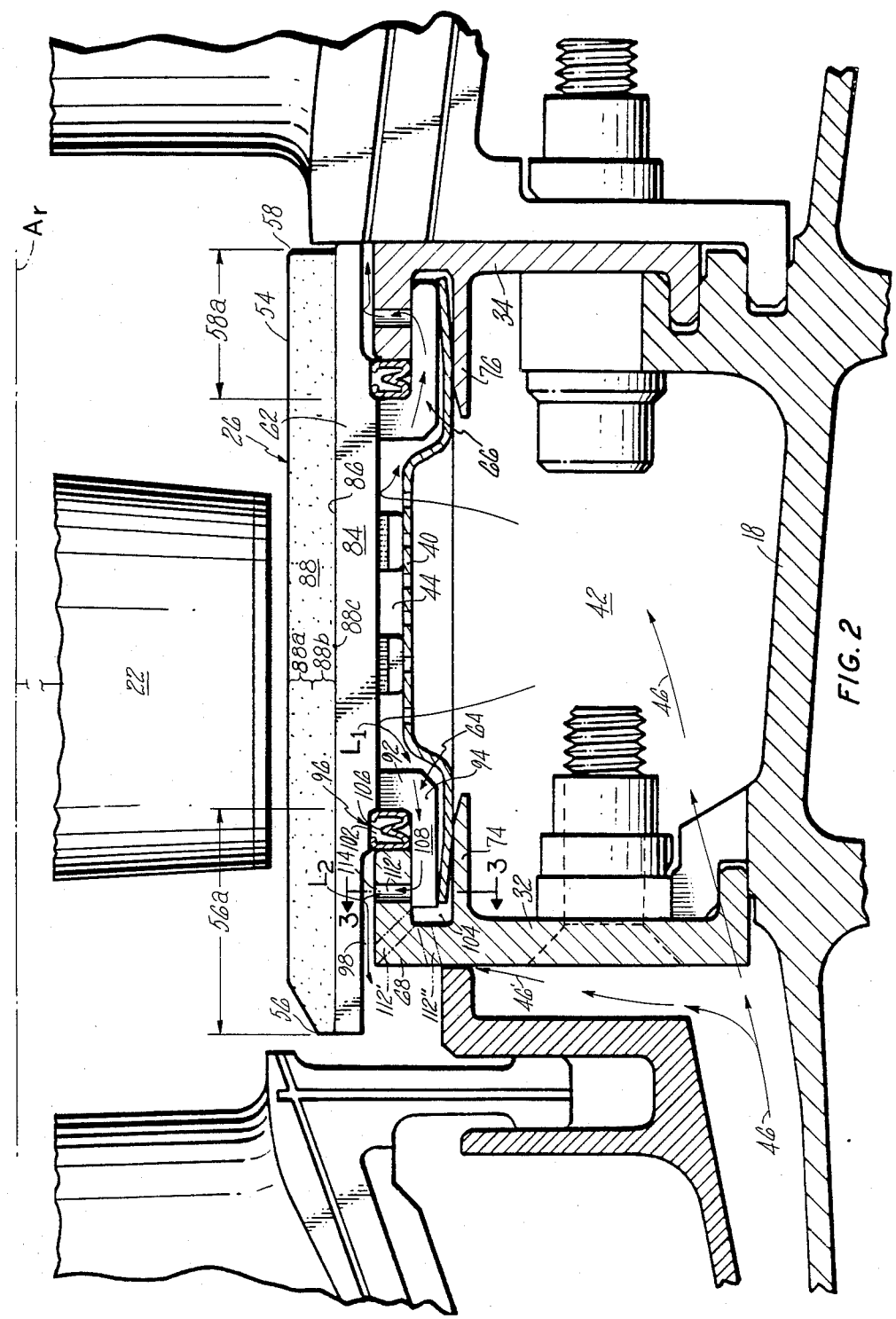
FIG. 2 is a cross-sectional view of the components shown in FIG. 1 taken along a plane which is displaced circumferentially from the view shown in FIG. 1 to show the components in cross-section.

FIG. 2 is a cross-sectional view of the components shown in FIG. 1 taken along a plane which is displaced circumferentially from the view shown in FIG. 1 to show the relationship between the upstream support 32, the downstream support 34 and one of the seal segments 54 of the outer air seal 26. The plate 62 of the seal segment includes a substrate 84. The substrate has a surface 86 which extends circumferentially about the axis $A_r$. The upstream hook 64 and downstream hook 66 extend outwardly from the substrate. A ceramic facing material 88 is attached to the substrate. The ceramic facing material has a ceramic surface layer 88a and a ceramic-metal intermediate layer 88b which, with an associated bond layer 88c, attaches the ceramic surface layer to the substrate. The ceramic surface layer 88a extends circumferentially about the axis $A_r$ and rearwardly from the leading edge 56 to the trailing edge 58 to bound the working medium flow path 14.

The upstream hook 64 is attached to the substrate 84 of the plate 62. The upstream hook has a first section 92 extending outwardly from the plate and a second section 94 extending axially from the first section toward of the leading edge. The second section is spaced radially from the substrate of the plate leaving a circumferentially extending groove 96 therebetween.

The upstream support 32, the downstream support 34, the seal segment 54, and the impingement plate 40 define four cavities near the leading edge region 56a and four cavities near the trailing edge region 58a. The following description of the structure and cavities near the leading edge region is equally applicable to the structure and cavities near the trailing edge region. The first cavity near the leading edge region is the impingement air cavity 44. The upstream support flange 68 is spaced radially outwardly from the substrate of the seal plate leaving a second cavity 98 therebetween. The flange is spaced axially from the first section 92 of the hook leaving a third cavity 102 therebetween. The second section 94 of the hook is spaced axially from the upstream support leaving a fourth cavity 104 therebetween.

The impingement plate 40 is a first seal member which extends between the upstream support 32 and the second section 94 of the upstream hook 64 to block the flow of cooling air along a flow path outwardly of the hook and between the impingement plate 40 and the outer flange 74 into the fourth cavity 104. A second seal member, such as the W-seal member 106, is disposed in the third cavity 102 and extends between the seal segment and the upstream support to block the leakage of cooling air through the third cavity into the second cavity 98 along a flow path between the seal segment and the support. As will be realized, the second seal member might extend between the upstream support and the seal plate of the seal segment or between the upstream support and an uninterrupted portion of the hook.

Figure 3:
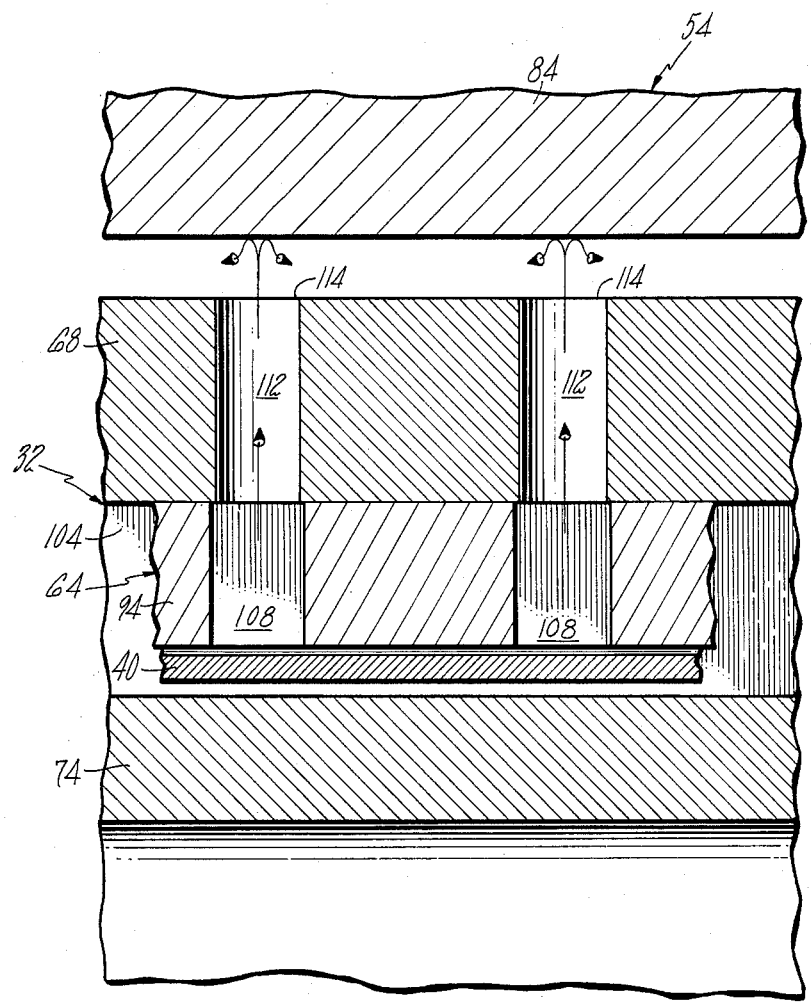
FIG. 3 is a cross-sectional view taken along the lines 3—3 of FIG. 2.

FIG. 3 is a cross-sectional view of a portion of the seal segment and the upstream support taken along the lines 3—3 of FIG. 2. As shown in FIG. 2 and FIG. 3, each hook has one or more passages for cooling air such as a plurality of slots as represented by the slots 108. The slots are spaced circumferentially one from the other and extend axially through the upstream hook to interrupt the circumferential continuity of the hook and to place the first cavity 44 in flow communication with the fourth cavity 104. The upstream support has at least one passage, such as a plurality of metering holes as represented by the metering hole 112, which are in flow communication with the second cavity through an opening 114 and in flow communication through the slot with the first cavity 44 for cooling air.

The metering holes 112 are axially aligned with the edge region of the seal segment and are radially oriented for directing the cooling air in the radial direction across the second cavity such that the cooling air impinges on the edge region of the seal plate. Alternatively, as shown in phantom in FIG. 2, metering holes 112' might be in flow communication through the fourth cavity and the slots 108 with the first cavity to direct cooling air at an angle with respect to the edge region of the outer air seal. By reason of the orientation of the holes, the holes would cause the cooling air to have a radial component of velocity that carries the cooling air toward the forward portion of the edge region 56a of the seal segment. Cooling air holes 112" might also extend radially inwardly. These holes direct the cooling air with a radial inward component of velocity to impinge the cooling air against the adjacent structure in a region of the engine adjacent to the support to locally oppose the leakage of cooling air along the flow path 46'.

As shown in FIG. 3, each slot 108 in the hook 64 is aligned with an associated passage 112 in the flange 68 upstream support 32. The seal segment is indexed with respect to the support by an indexing pin (not shown) to maintain this alignment.

During operation of the gas turbine engine 10, cooling air and hot working medium gases are flowed into the turbine section 12 of the engine. The hot working medium gases are flowed along the annular flow path 14. Cooling air is flowed along the primary flow path 46 and enters the turbine section outwardly of the hot working medium flow path. Components of the turbine section, including the outer case 18, the outer air seal 26, and the upstream and downstream supports 32, 34 for the outer air seal are heated by the working medium gases and cooled by the cooling air. Cooling air is flowed along the primary flow path 46 into the outer cavity 42 outwardly of the outer air seal 26. Because of tolerance variations, leak paths, such as the leak path 46', extend between the upstream support and the adjacent static structure into the region adjacent to the upstream support 32. Accordingly, a seal member (not shown) is disposed between the upstream support 32 and the adjacent stator assembly. Although the loss of cooling air is blocked along the leak path 46' by the seal member, some leakage does occur.

After the cooling air is flowed into the outer cavity 42, the cooling air is metered through the impingement holes 52 in the impingement plate 40 and impinged on the substrate 84 of the plate at a plurality of first locations, as represented by the location $L_1$. The cooling air is collected in the impingement air cavity and flowed through the passages (slots) 108 in the hook of the upstream support. The cooling air is either flowed into the fourth cavity and thence to the holes 112, or directly to the holes 112 where it is metered through these holes in the support, directed across the second cavity 98, and impinged again on the substrate of the arcuate seal segment at a second location $L_2$. The heat transfer coefficient between the cooling air and the seal segment which results from impinging the cooling air on the substrate is at least 500% greater than the heat transfer coefficient which results from flowing cooling air along the surface of the substrate to remove heat by convective heat transfer. After being impinged on the seal segment for a second time, the cooling air is flowed into the adjacent region of the engine to convectively cool the leading edge region of the seal segment.

For various reasons, more cooling air might flow through one slot than another. The fourth cavity acts as a manifold to more evenly distribute the cooling air to the passages in the support. Additional air is flowed through the slot having such additional flow to the fourth cavity. A portion of the additional cooling air is then flowed through the fourth cavity to the region experiencing reduced flow.

The alternate passages 112', 112" may be used in combination with each other and with the passage 112 to distribute cooling air in the same useful way. The cooling air passage 112" is angled inwardly to impinge cooling air on the adjacent stator assembly with an inward component of radial velocity to oppose the cooling air flowing out through leak path 46'. The cooling air when impinged, converts a portion of its dynamic velocity pressure to static pressure creating a small region of higher static pressure to locally block the leakage of cooling air along the leak path 46'.

In addition to increasing the coefficient of heat transfer between the cooling air and the seal segment to effectively use the cooling air and to increase the engine efficiency, the cooling air is precisely metered through the upstream supports decreasing the wasteful use of cooling air. The slots in the upstream and downstream hooks decrease the local variation in stress caused by the hooks. The decrease in the variation in stress has a beneficial effect on the service life of the ceramic faced outer air seal. It is believed that these local variations in stress have an adverse effect on the structural integrity of the bond layer 88c between the ceramic material and the substrate. Finally, the cooling air flowed through the slots in the hooks and through the passages in the support provide transpirational cooling to these components and bathe the components in a layer of cool air to decrease thermal stresses in the components and to avoid overheating of the components.

Although the invention has been shown and described with respect to detailed embodiments thereof, it should be understood by those skilled in the art that various changes in form and detail thereof may be made without departing from the spirit and the scope of the claimed invention.

I claim:

1. In a gas turbine engine of the type having an annular flow path for working medium gases, an engine case extending circumferentially about the working medium flow path, a coolable stator assembly which includes an outer air seal spaced radially inwardly from the engine case leaving a cavity for cooling air therebetween and a means for supporting the outer air seal from the case about the working medium flow path, the improvement which comprises:

a coolable stator assembly which includes
an outer air seal formed of an array of arcuate segments, at least one of said segments having a passage for cooling air which extends through the segment and which is in flow communication with said cavity; and
a means for supporting the outer air seal which includes a support extending inwardly of the engine to engage the outer air seal, the support having at least one passage in flow communication with said passage in the outer air seal for metering the flow of cooling air which is radially oriented for directing cooling air radially inward through the support toward the arcuate seal segment to radially impinge the cooling air on the arcuate seal segment.

2. The coolable stator assembly of claim 1 wherein the arcuate seal segment has a circumferentially extending hook which adapts the seal segment to engage the support and wherein the passage in the seal segment is a slot which extends through the hook to interrupt the circumferential continuity of the hook.

3. The coolable stator assembly of claim 1 wherein the arcuate seal segment has a circumferentially extending hook which adapts the seal segment to engage the support and wherein the passage in the seal segment extends through the hook.

4. The coolable stator assembly of claim 3 wherein the arcuate seal segment has a circumferentially extending edge, the hook extends from the arcuate seal segment at a first location spaced axially from the edge leaving an edge region therebetween and wherein each passage in the support has a discharge opening for cooling air at a second axial location which is radially outward of the edge region.

5. The stator assembly as claimed in claim 4 wherein the passages in the hook are slots extending through the hook and wherein the support has a plurality of holes in flow communication with the slots in said hook.

6. The stator assembly as claimed in claim 5 wherein a first seal member extends outwardly of the hook to direct the cooling air inwardly through the slots toward the holes in the support and a second seal member engages the arcuate seal segment at an axial location between the first axial location and the second axial location and engages the support at an axial location between the first axial location and the second axial location to direct the flow of cooling air outwardly through the slots toward the holes in the support.

7. The stator assembly as claimed in claim 6 wherein the support has a flange which engages the hook of the seal segment and which is spaced radially from the arcuate segment leaving a cavity therebetween across which cooling air is flowed before being impinged on the edge region and through which cooling air is flowed after impingement on the outer air seal to provide convective cooling to the flange and to the edge region.

8. For a gas turbine engine having an annular flow path for hot working medium gases disposed about an axis $A_e$ and an engine case which extends circumferentially about the working medium flow path, a stator assembly which comprises:
   an outer air seal which is spaced radially from the engine case leaving a first cavity for cooling air therebetween and which is formed of an array of arcuate seal segments extending circumferentially about the working medium flow path, each seal segment having
      a plate having an edge which extends circumferentially about the plate and a sealing surface which extends axially from the edge and which bounds the working medium flow path,
      a hook attached to the plate which has a first section extending outward from the plate and a second section extending axially from the first section in the direction of the edge and spaced radially from the plate leaving a circumferentially extending groove therebetween; and
   a support which extends inwardly from the engine case to engage the hook of the seal segment, the support having
      a flange which extends into the groove formed by the hook and the seal plate to engage the seal segment, the flange being spaced radially from the seal plate leaving a second cavity therebetween, being spaced axially from the first section of the hook leaving a third cavity therebetween and being spaced axially from the second section of the hook leaving a fourth cavity therebetween;
   wherein each hook has a plurality of slots, spaced circumferentially one from the other which extend axially through the hook to interrupt the circumferential continuity of the hook and to place the first cavity in flow communication with the fourth cavity, wherein a first seal member extends between the support and the second section of the hook to block the flow of cooling air along a flow path outwardly of the hook into the fourth cavity, and a second seal member disposed in the third cavity extends between the seal segment and the support to block the leakage of cooling air into the second cavity along a flow path between the seal segment and the support, and wherein each support has a plurality of passages outwardly of and aligned with the edge region that are in flow communication with the second cavity and in flow communication through said slot with the first cavity for cooling air for directing cooling air in the radial direction toward the edge region.

9. The stator assembly as claimed in claim 8 wherein said passages in said support meter the flow of cooling and radially direct cooling air across the second cavity such that the cooling air impinges on the edge region of the seal plate.

10. The stator assembly as set forth in claim 9 wherein at least one passage in the support is aligned with a slot in the hook such that cooling air is flowed directly from the first cavity to the passage in the support through the slot.

11. A method for cooling a stator assembly disposed about the axis of an axial flow rotary machine which includes an outer air seal spaced radially inwardly from the engine case leaving a cavity for cooling air therebetween and a means for supporting the outer air seal about the working medium flow path, comprising:
   radially impinging cooling air against the outer air seal at a first location;
   collecting the cooling air impinged against the outer air seal;
   flowing a portion of the collected cooling air through a passage in the outer air seal and thence metering the flow through the support for the outer air seal and directing the flow through the support such that it is discharged from the support in a radially oriented direction; and
   radially impinging the cooling air flowed through the outer air seal and the support against the outer air seal at a second location.

12. The method for cooling the stator assembly of claim 11 wherein the stator assembly has an upstream edge region and a downstream edge region and the stator assembly includes an impingement plate which extends between the end regions; wherein the step of radially impinging the cooling air against the outer air seal at a first location includes the step of flowing the cooling air through the impingment plate to impinge against the outer air seal at a first location between the edge regions; and, wherein the step of radially impinging the cooling air against the outer air seal at a second location includes the step of impinging the cooling air against one of said edge regions.

13. The method for cooling a stator assembly of claim 11 wherein the outer air seal includes an outwardly extending hook for engaging the support structure and wherein the step of flowing the cooling air through the outer air seal includes the step of flowihg the cooling air through the hook.

* * * * *